(12) United States Patent
Yerli (10) Patent No.: US 9,436,941 B1
(45) Date of Patent: Sep. 6, 2016

(54) SMART PAYMENT INSTRUMENTS (71) Applicant: Calay Venture S.àr.l., Bettembourg (LU)

(72) Inventor: Cevat Yerli, Frankfurt am Main (DE)

(73) Assignee: Calay Venture S.à.r.l., Bettembourg (LU)

( * ) Notice: Subject to any disclaimer, the term of this patent is extended or adjusted under 35 U.S.C. 154(b) by 0 days.

(21) Appl. No.: 14/625,357

(22) Filed: Feb. 18, 2015

(51) Int. Cl.
*G06Q 40/00* (2012.01)
*G07D 11/00* (2006.01)
*G07F 19/00* (2006.01)
*G06Q 20/34* (2012.01)
*G06Q 20/40* (2012.01)

(52) U.S. Cl.
CPC .......... *G06Q 20/341* (2013.01); *G06Q 20/409* (2013.01)

(58) Field of Classification Search
CPC ...... G06Q 40/00; G07D 11/00; G07F 19/00; G07F 17/00; G06K 5/00; G06K 7/08; G06K 19/06; G06K 19/00
USPC ................ 235/379, 380, 375, 487, 492, 451
See application file for complete search history.

(56) References Cited

U.S. PATENT DOCUMENTS

| | | | | |
|---|---|---|---|---|
| 5,276,311 A * | 1/1994 | Hennige | ............ | G06K 19/0719 235/380 |
| 8,030,745 B2 * | 10/2011 | Yamazaki | .......... | G06K 19/0728 257/53 |
| 9,129,270 B2 * | 9/2015 | Spodak | ................ | G06Q 20/105 |
| 9,262,422 B1 * | 2/2016 | Daniel | .............. | G06F 17/30047 |
| 2005/0263596 A1 * | 12/2005 | Nelson | ................. | G06K 19/077 235/441 |
| 2006/0038004 A1 * | 2/2006 | Rielly | ................ | G06Q 20/1085 235/379 |
| 2008/0061152 A1 * | 3/2008 | Shingai | ............ | G06K 19/07703 235/492 |
| 2008/0319912 A1 * | 12/2008 | Faith | .................... | G06Q 20/341 705/65 |
| 2009/0033488 A1 * | 2/2009 | Suzuki | ............... | G06K 19/0723 340/540 |
| 2009/0150294 A1 * | 6/2009 | March | ................... | G01S 5/0027 705/67 |
| 2009/0159673 A1 * | 6/2009 | Mullen | ............ | G06K 19/06206 235/380 |
| 2010/0038436 A1 * | 2/2010 | Gaillard | ............. | G06K 17/0022 235/492 |
| 2011/0060640 A1 * | 3/2011 | Thompson | ............. | G06Q 20/32 705/14.36 |
| 2011/0131128 A1 * | 6/2011 | Vaananen | ............... | G06Q 20/10 705/37 |
| 2011/0140841 A1 * | 6/2011 | Bona | ................. | G06K 19/06187 340/5.83 |
| 2013/0008967 A1 * | 1/2013 | Chen | ................... | G06K 19/0723 235/492 |
| 2013/0048712 A1 * | 2/2013 | Guillaud | ............ | G06Q 20/3221 235/379 |

* cited by examiner

*Primary Examiner* — Edwyn Labaze
(74) *Attorney, Agent, or Firm* — Christensen O'Connor Johnson Kindness PLLC (57) ABSTRACT

A payment instrument is disclosed, including a memory configured to store one or more sets of identification data, a communication interface configured to connect the payment instrument to a network, one or more access interfaces configured to provide access to the one or more sets of identification data, one or more displays configured to display representations of the one or more sets of identification data, and a processing circuit configured to receive, via the communication interface, at least a part of a representation of one of the one or more sets of identification data from a server via the network, and cause the representation to be displayed on the one or more displays. Furthermore, a method and a system for operating payment instruments are disclosed.

18 Claims, 3 Drawing Sheets

SMART PAYMENT INSTRUMENTS

TECHNICAL FIELD

The present disclosure relates to a payment instrument and a method for operating a payment instrument. In particular, the present disclosure relates to a payment instrument that may be connected to a network and can be operated by a system including respective server devices.

BACKGROUND

Payment instruments are an essential part of modern payment systems and may include payment cards, credit cards, direct debit cards, and checks, which all relate to non-cash instruments with which end-users of payment systems may transfer funds between accounts and banks or other financial institutions. Most individuals are now issued a vast array of plastic cards by their bank, credit card provider, frequent flyer program provider, customer bonus program provider, car park provider, employer, gym, library, etc. Carrying such a large quantity of cards in a wallet is very inconvenient for users.

Approaches have been variously discussed, where a single card may represent a plurality of issued cards to reduce the actual number of cards. However, since safety and efficiency of payment instruments are important for both maintaining confidence in the currency and keeping the economy running smoothly, each issuer typically relies on its own security standards, which cannot be incorporated into a single card using prior techniques.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

As disclosed herein, what is needed is an approach which enables the use of a single payment instrument which may represent several issued payment instruments from several providers but which, however, maintains a high level of security with regard to each individual provider.

The above issues are solved by, for example, a payment instrument, a method for operating a payment instrument, and a system for operating payment instruments, according to illustrative embodiments disclosed herein.

According to a first aspect of the present disclosure, a payment instrument is provided, including a memory configured to store one or more sets of identification data, a communication interface configured to connect the payment instrument to a network, one or more access interfaces configured to provide access to the one or more sets of identification data, one or more displays configured to display representations of one or more sets of identification data, and a processing circuit configured to receive, via the communication interface, at least a part of a representation of one of the one or more sets of identification data from a server via the network, and cause the representation to be displayed on the one or more displays.

The payment instrument allows for storage of several sets of identification data, which may each represent data related to various providers of payment instruments. For example, a first set of identification data may correspond to a first bank, another set of identification data may correspond to a second bank, and a third set of identification data may correspond to a company or institution. Each of the sets of identification data may relate to the same user of the payment instrument; however, they may differ, for example, in account information, a different spelling of the name of the user, etc., as well as including different data, which may, for example, include interests or preferences of the user with regard to a particular provider of a payment instrument.

The payment instrument is fully connected to a network and receives, via the network, parts of individual representations of the sets of identification data for display on the one or more displays of the payment instrument. Typically, payment instruments are visually verified when used for payment transactions or similar services to identify and compare characteristics related to the user presenting the payment instruments, the transaction or service with a representation displayed on the payment instrument, such as a displayed name of the user, a signature of the user, a photograph of the user, a security code, and others. Since the representation displayed on the payment instrument may represent a security aspect of the payment instrument, they are at least partially provided via the network from a remote server, such as a central server of an entity issuing or providing payment instruments. Hence, each remote server may be linked to an issuer or provider of payment instruments, such as a bank, company or institution, which may correspond to at least one set of identification data. Since the representations for the sets of identification data are at least partially provided by a remote server, which may represent a trusted entity, each issuer or provider may directly control a security level associated with a respective set of identification data. This leads to an improved and individualized security of the payment instrument which remains under control of each original issuer or provider.

According to one embodiment, the one or more displays are arranged on one or more sides of the payment instrument. Preferably, the one or more displays are flexible displays. Hence, the payment instrument may have a flexible form and the payment instrument may resemble a plastic item or a paper-like item with corresponding displays, such as an e-ink display or a flexible OLED display, for example, YOUM displays available from Samsung. A first display may be arranged on a first side of the payment instrument and may display a number of the payment instrument related to an issuer or provider, a validity date of the payment instrument, and a name of the holder of the payment instrument. These data may correspond to the data stored in one of the sets of identification data within the memory of the payment instrument. Hence, the processing circuit may be configured to use the set of identification data to generate at least a part of the representation of the set of identification data, for example, by generating a representation of individual elements stored in the set of identification data, such as the number of the payment instrument, the validity date, or the name of the holder of the payment instrument. Yet, at least some parts of the representation of the one or more sets of identification data are received from a server via the network, which may represent security features defined by individual issuers or providers of payment instruments linked to individual sets of identification data, for example, a signature of the holder, security codes, an image of the holder, and other features which may neither be stored locally, nor generated by the processing circuit for display. Accordingly, one or more further displays may be arranged on an opposite side of the payment instrument and may, for example, display one or more of the signature of the holder of the payment instrument, the photograph of the holder of the payment instrument, and other security features as defined by the issuer or provider, which may correspond to a respective set of identification data, which are, however, provided via the network to the payment instrument for display.

In an embodiment, the one or more access interfaces include a contact surface arranged on one of the one or more sides of the payment instrument. For example, the access interface may be a chip that may enable retrieval of at least some entries of current set of identification data by inserting the payment instrument into a terminal. Furthermore, the one or more access interfaces may provide contactless access to the identification data, such as using an NFC chip.

Preferably, the one or more access interfaces may include a chip on one side of the one or more sides of the payment instrument and a magnetic strip on another side of the one or more sides of the payment instrument. Hence, the payment instrument can be used as a classical payment instrument resembling a plastic card or bonus card which may be inserted into a terminal or slid through a reading device. Hence, the payment instrument can be used with existing technologies without requiring an update of legacy terminal devices.

In yet another embodiment, the processing circuit is further configured to select one of the sets of identification data, adjust the one or more access interfaces to provide access to the selected set of identification data, and request at least a part of a representation of the selected set of identification data from the server. Accordingly, the payment instrument may be adapted to resemble a traditional payment instrument corresponding to each one of the sets of identification data by directing the one or more access interfaces to the selected set of identification data. Furthermore, the processing circuit may generate a part of the representation of the selected set of identification data based on entries in the set of identification data. However, at least a part of the representation of the set of identification data is requested from the server, such as a trusted entity of the issuer or provider related to the selected set of identification data. The requested part of the representation may include security features of the payment instrument, which are directly received from the trusted entity and displayed on the one or more displays. Hence, the security features cannot be manipulated locally, thereby leading to an improved level of security.

In an embodiment, the processing circuit is further configured to receive, via the communication interface, a new set of identification data and at least a part of a representation of the new set of identification data from the server, store the new set of identification data in the memory, and cause the representation of the new set of identification data to be displayed on the one or more displays. The payment instrument can be extended with new sets of identification data that are directly stored in the memory. Since at least a part of the representation of the new set of identification data is directly received from the server for display on the one or more displays, the information shown on the payment instrument remains at least partially under direct control of the issuing or providing entity.

In yet another embodiment, the memory is further configured to store indications of one or more apps, each linked to at least one of the one or more sets of identification data, wherein the processing circuit is configured to initiate execution of the one or more apps and display data on at least one of the one or more displays responsive to execution of the one or more apps. Each app may be program code that can be executed in order to perform a predefined task. In particular, the app may be responsive to user input or sensor input and may generate data which are suitable for display on the one or more displays of the payment instrument.

For example, the functionality of an app may configure the payment instruments to behave as an individual credit card or any other plastic card the user may be provided with. Furthermore, individual apps may enable management of the payment instrument. For example, a user may purchase the payment instrument and download an app which may enable the user to register a plurality of credit cards and other plastic cards with the flexible payment instrument according to embodiments of the present disclosure. Responsive to execution of the app, individual issuers or providers of the existing cards may deliver respective sets of identification data and at least parts of representations of the sets of identification data to the payment instrument.

Preferably, at least some of the one or more apps may be linked to at least one of the one or more sets of identification data. For example, an app may be linked to a dedicated set of identification data and may provide functionality corresponding to an original card associated with the set of identification data. For example, a credit card or debit card app may configure the payment instrument and communicate with a terminal, such as an ATM, and/or a payment gateway through the one or more access interfaces, such as a chip and/or magnetic strip in a conventional way.

The apps may be configured to directly execute on the processing circuit of the payment instrument. In yet another embodiment, the one or more apps are executed on a remote server, wherein the processing circuit is further configured to receive, via the communication interface, the data for display from the remote server. Hence, for example, security critical apps may be configured to execute on the remote server, in which case the memory may be configured to store indications of the security critical apps only and the processing circuit may be configured to initiate an execution of the security critical apps on the remote server. Responsive to execution of the security critical apps on the remote server, the payment instrument may receive an output of the executed security critical app for display on the displays of the payment instruments. For example, the data may be any kind of output of the app, which may comprise a user interface including interactive elements, text, images and other electronic content, such as audio and/or video content. Furthermore, the data may be used by the processing circuit to alter, change or adapt the representation of the set of identification data. For example, the data may be used as an overlay on the representation of the set of identification data and may comprise a currently generated security code, a nonce, a hash, or a one or two-dimensional visual code, such as a QR code or barcode, which may overlay the representation of the sets of identification data. The data may be a description of the content to be displayed on the displays and can be further processed by the processing circuit in order to generate the output for the displays. However, the data may also be directly displayed without any pre-processing. As such, the data may be an image, a sequence of images, or a stream, which may be received by the processing circuit and directly delivered to the display. Hence, the remote server executing the app may also include a rendering entity, which may transform the output of the executed app into data that can be directly displayed on a display of the payment instrument, and/or a streaming entity, which may stream the transformed output to the payment instrument. This allows for payment instruments with a reduced number of resources that do not require any further rendering functionality.

In one embodiment, the payment instrument further comprises an input interface, wherein the processing circuit is further configured to receive user input via the input interface. Preferably, the input interface is integrated in the one or more displays. Accordingly, the one or more displays may provide touch capability in order to enable control of the payment instrument and/or the apps directly via the displays of the payment instrument, thereby resembling a touch screen.

Preferably, the payment instrument is configured such that any processing is executed on one or more remote servers or in a cloud comprising a plurality of servers. As used throughout this description, a server refers to a computing device which is capable of connecting to a client, such as the payment instrument, and providing respective functionality, including one or more of executing of apps and providing parts of representations of sets of identification data. A server could also be understood as a software entity providing the respective functionality. In this case, the server is provided by a computing device which executes the functionality provided by the server.

In an embodiment, the processing circuit is further configured to select one of the sets of identification data based on the user input, initiate execution of an app based on the user input, and/or supply the user input to an executing app. However, it is to be understood that the user input may be processed in any other suitable way in order to control the processing within the payment instrument and/or a remote processing related to the payment instrument. For example, a dedicated app may be used to unlock the payment instrument by analyzing an entered password, reading a fingerprint, detecting a gesture or the like. The app may be directly executed by the processing circuit and may display on the one or more displays a user interface including interactive elements enabling an entry of one or more of the password, fingerprint, gesture, or the like to a user. The user may utilize a touch functionality provided by the displays to directly interact with the individual interactive elements in order to provide the input. The app may receive and compare the input with previously stored data, such as a hash of the password, characteristics of the fingerprint, features of the gesture, or the like, and may either unlock the payment instrument if the entered input and the stored data correspond to each other, or lock the payment instrument if the entered input is incorrect and/or after a number of attempts of the user to unlock the payment instrument.

In an embodiment, the processing circuit is further configured to receive, via the communication interface, a new app and store the new app in the memory. It is to be understood that if the apps are to be executed on a remote server, the payment instrument may receive and store indications of the apps only, such as an icon, a link, identification and the like.

In yet another embodiment, the processing circuit is further configured to verify the new app according to at least one set of identification data stored in the memory. Hence, the payment instrument may be extended with new apps, which may, for example, be downloaded from a remote server, and the payment instrument may already comprise data for verifying the new app. This can be used to further increase the security of a download of individual apps. Furthermore, the new app may be linked to at least one of the one or more sets of identification data and the linked set of identification data can be used to verify the new app. Subsequently, the processing circuit may be configured to request a representation of the linked set of identification data from the server and cause the requested representation of the linked set of identification data to be displayed on the one or more displays. Hence, a downloaded app may directly configure the payment instrument to behave as a payment instrument as specified by the linked set of identification data. For example, the app may be issued by a company or institution that has already registered the payment instrument by providing a set of identification data related to the company or institution. The user may choose to download an app, such as an app which may provide the user with various services of the company or institution and/or promotional offers of the company or institution. The download of the app may directly configure the payment instrument to behave as a payment instrument of the company or institution by selecting the respective set of identification data, and requesting at least a part of the representation of the linked set of identification data from the server, in order to allow for a direct use of the payment instrument with terminals of the company or institution. The user may explicitly choose to download the app. However, the payment instrument may also be configured to automatically receive a download of an app if the payment instrument has already stored a corresponding set of identification data. As such, the user may be directly provided with current information and functionality provided by the app.

Preferably, the payment instrument may further comprise a sensor configured to determine a geolocation of the payment instrument. The payment instrument may further use data from the communication interface to refine the determined location of the payment instrument. The payment instrument may transmit the location data via the network to the (remote) server. In response, the server may determine whether an issuer or provider of identification data, such as a bank, a company or institution, is located within proximity of the location, and may directly initiate an upload of a respective app and/or current data to the payment instrument. For example, as soon as a user enters a shop or location, such as a library, the payment instrument may be automatically configured to resemble a bonus card of the business or a user card of the library. It is to be understood that even though embodiments refer to a bank, company or institution, such as a shop or a library, the present disclosure is not limited to a particular issuer or provider of identification data or payment instruments. Rather, the payment instrument is applicable in any environment and with any kind of entity issuing or providing identification data for use with payment instruments.

In an embodiment, the payment instrument has the form of a card. For example, the card may resemble a credit card, a debit card, a gift card, and others. Preferably, the card is a plastic card, which can be carried in a wallet of the user. Yet, the card may dynamically adjust its appearance and functionality as discussed in one or more embodiments of the present disclosure.

In a further embodiment, the processing circuit is configured to verify a financial transaction in response to a request from a terminal received via the one or more access interfaces based on a set of identification data. For example, the processing circuit may receive data on the financial transaction via the one or more access interfaces and may communicate with the (remote) server to verify and/or confirm the financial transaction. The (remote) server may provide a part of the representation of the set of identification data used for the financial transaction via the network to the payment instrument. For example, the representation may include security features, which may be directly derived from information of the financial transaction, such as a security code, a hash, or the like, which can be displayed on the payment instrument in order to confirm the financial transaction. The terminal may read the displayed data and compare the data to internal confirmation data, such as information that may be received by the terminal from the (remote) server via another communication channel. This may significantly increase the security of financial transactions.

According to another aspect, a method for operating a payment instrument connected to a network via a communication interface is provided. The method comprises the steps of maintaining one or more sets of identification data in a memory of the payment instrument, providing access to the one or more sets of identification data via one or more access interfaces of the payment instrument, receiving, via the communication interface, at least a part of a representation of one of the one or more sets of identification data from a server via the network, and displaying the representation on the one or more displays.

In one embodiment, the method further comprises selecting one of the sets of identification data, adjusting the one or more access interfaces to provide access to the selected set of identification data, and requesting a representation of the selected set of identification data from the server.

According to another embodiment, the set of identification data can be selected, for example, responsive to user input or an execution of an app on the payment instrument or on a remote server. In a further embodiment, the method further comprises receiving, via the communication interface, a new set of identification data and at least a part of a representation of the new set of identification data from the server, storing the new set of identification data in the memory, and displaying the representation on the new set of identification data on the one or more displays.

In yet another embodiment, the method further comprises maintaining one or more apps in the memory, initiating execution of the one or more apps, and displaying data on at least one of the one or more displays responsive to execution of the one or more apps.

In a further embodiment, the one or more apps are executed on a remote server, wherein the method further comprises receiving, via the communication interface, the data for display from the remote server.

In a further embodiment, the method further comprises one or more of one of selecting a set of identification data based on user input, initiating execution of an app based on the user input, and supplying the user input to an executing app.

According to one embodiment, the method further comprises determining a geolocation of the payment instrument.

In yet another embodiment, the method further comprises verifying a financial transaction in response to a request from a terminal received via the one or more access interfaces.

According to another aspect of the present disclosure, a system for operating payment instruments is provided. The system comprises one or more server devices and a plurality of payment instruments communicating with the one or more server devices via a network. Each of the plurality of payment instruments may be a payment instrument according to embodiments of the present disclosure. For example, a payment instrument may include a memory configured to store one or more sets of identification data, a communication interface configured to connect the payment instrument to the network, one or more access interfaces configured to provide access to the one or more sets of identification data, one or more displays configured to display representations of the one or more sets of identification data, and a processing circuit configured to receive, via the communication interface, at least a part of a representation of one of the one or more sets of identification data from one of the one or more server devices via the network, and cause the representation to be displayed on the one or more displays.

According to a further aspect, a non-transitory computer-readable medium having instructions stored thereon is provided, wherein said instructions, in response to their execution by a computing device, cause said computing device to automatically perform a method for operating a payment instrument according to one or more embodiments of the present disclosure. In particular, the instructions may cause said computing device to automatically perform a method including maintaining one or more sets of identification data in a memory of the payment instrument, providing access to the one or more sets of identification data via one or more access interfaces of the payment instrument, receiving, via a communication interface, at least a part of a representation of one of the one or more sets of identification data from a server via the network, and displaying the representation on the one or more displays.

Individual processing of the method according to one or more embodiments of the present disclosure may be performed by a processor or a dedicated processor, such as on dedicated hardware. Furthermore, respective processing steps may correspond to instructions, which may be stored in memory, and the processor or dedicated processor may be configured according to the stored instructions to perform the method according to one or more embodiments of the present disclosure.

Furthermore, it is to be understood that components of the payment instrument according to one or more embodiments of the present disclosure may be configured to perform processing steps according to a method for operating a payment instrument according to one or more embodiments of the present disclosure, and the method for operating a payment instrument according to one or more embodiments of the present disclosure may include processing steps corresponding to functionality or processing of components of a payment instrument according to one or more embodiments of the present disclosure, in any combination. The system for operating payment instruments may also be further configured with functionality and structural features as defined by the payment instrument and the method for operating a payment instrument according to one or more embodiments of the present disclosure, respectively, in any combination.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings that show by way of illustration various embodiments of the present disclosure. Also, various embodiments will be described below by referring to several examples. It is to be understood that the embodiments may include changes in design and structure without departing from the scope of the claimed subject matter.

Figure 1:
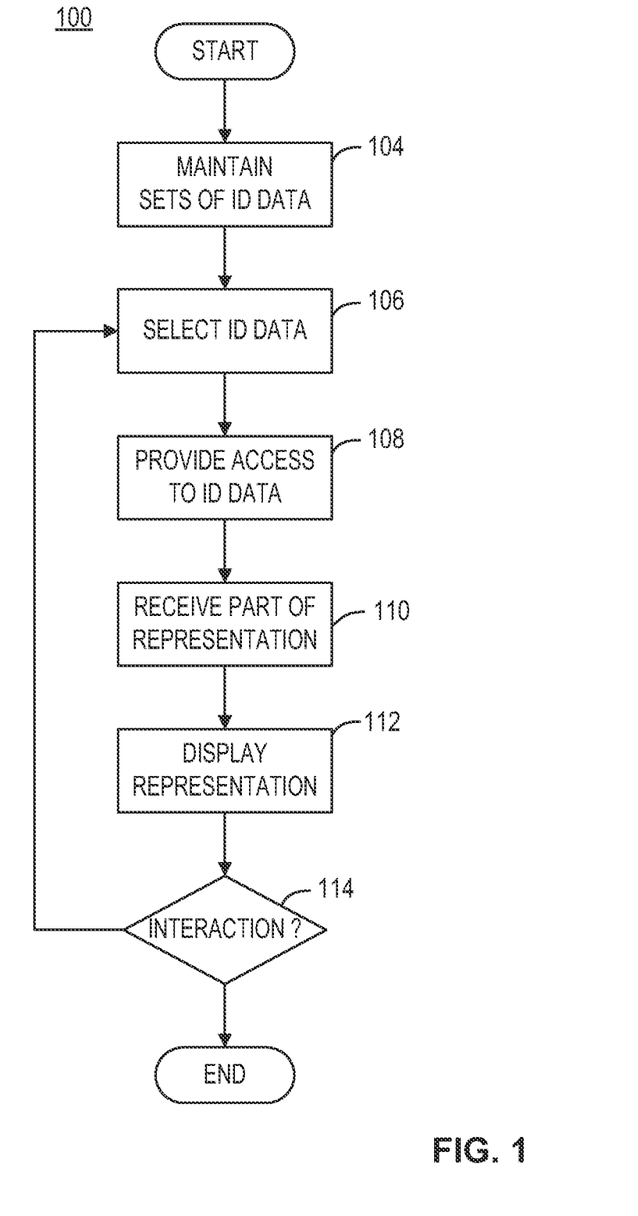
FIG. 1 illustrates a flow chart of a method according to an embodiment of the present disclosure.

FIG. 1 illustrates a flow chart of a method for operating a payment instrument according to an embodiment of the present disclosure. The method 100 may be for operating a payment instrument that is connected to a network via a communication interface. The payment instrument may further comprise a processing circuit, such as a processor, a chip or another integrated circuit, which may be configured to perform at least some of the steps of method 100.

The method may start and proceed with item 104, wherein the payment instrument may maintain one or more sets of identification data in a memory. Each set of identification data may be defined with respect to an issuing or providing entity, such as a bank, a company or an institution, which may define the set of identification data with regard to a user or holder of the payment instrument.

The method may proceed with item 106, wherein one of the sets of identification data may be selected. The payment instrument may provide access to the one or more sets of identification data via one or more access interfaces of the payment instrument. Preferably, the one or more access interfaces of the payment instrument are adjusted to provide access to the selected set of identification data in item 108.

Responsive to the processing in items 106 and 108, the method 100 may further request a representation of the selected set of identification data from a server via a network. As indicated in item 110, the method 100 may continue with receiving, via a communication interface, at least a part of the representation of the selected set of identification data from the server via the network.

Based on the selected set of identification data and the received part of the representation of the selected set of identification data, a complete representation may be assembled and displayed on one or more displays of the payment instrument, in item 112. For example, a processing circuit of the payment instrument may read the set of identification data and directly prepare parts of the representation "on card" within the payment instrument. For example, the processing circuit may extract a name of the holder and a number of the payment instrument from the set of identification data and may provide the data on the display according to one or more templates, which may also be stored in the set of identification data. The received part of the representation from the server may correspond to security features, such as an image of the holder or a signature, which may be provided by the remote server in order to enable a secure usage of the payment instrument. The combined representation may be displayed on the displays of the payment instrument in item 112. Thereafter, the user may proceed with using the payment instrument as if it was directly a conventional payment instrument issued by the issuing or providing entity related to the set of identification data, for example for payment purposes or identification purposes, in a reward program, a yield program and/or a promotional program.

In item 114, the method 100 may wait for any interaction. Suitable interactions may be a trigger via the network from a remote server or a mobile communication device, which may submit instructions for further configuring the payment instrument. Furthermore, the payment instrument may comprise an input interface to receive direct user input from the user of the payment instrument. Any interaction or input detected in item 114 may, for example, be used to select another set of identification data of the payment instrument, and the method 100 may proceed with item 106, wherein another set of identification data may be selected.

Even though method 100 has been described with regard to an application of user input to select a set of identification data, it is to be understood that the user input can also be applied for any other processing on the payment instrument or a (remote) server. For example, the user input may be supplied to program code (app) executing on the payment instrument or on a remote server. Furthermore, user input may be applied to initiate execution of an app on the payment instrument or on a remote server.

The user input may also be analyzed in order to determine that the payment instrument is to be deactivated or switched off and method 100 may end.

Figure 2:
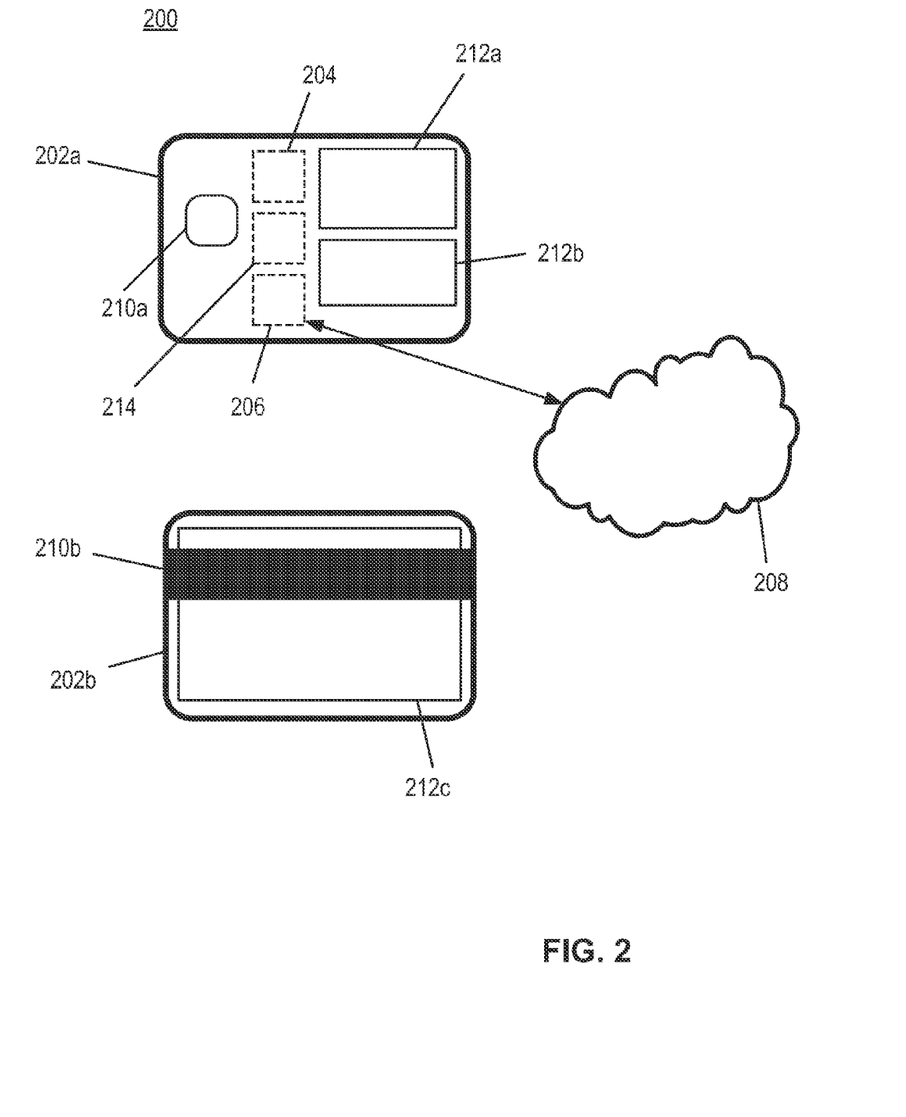
FIG. 2 shows a schematic diagram of a payment instrument according to an embodiment of the present disclosure.

FIG. 2 illustrates a schematic view of a payment instrument according to one embodiment of the present disclosure. The payment instrument 200 may have the form of a card having a front side 202a and a back side 202b, which are both shown in FIG. 2. It is to be understood that even though two distinct elements are shown in FIG. 2, the front side 202a and back side 202b represent different views on the same payment instrument 200.

The payment instrument 200 may comprise a memory 204, which may be configured to store one or more sets of identification data (not shown), and a communication interface 206, which may be configured to connect the payment instrument 200 to a network 208. The communication interface 206 is preferably a wireless communication interface, such as an NFC chip, which may communicate with a portable device, such as a smart phone, a tablet or pad computer, or a laptop computer, which may be configured to mediate the connection to the network 208. However, the communication interface 206 may also be a wireless interface enabling a connection to any wireless access point of the network 208, or a mobile data interface enabling direct access to an access point of a mobile network. The communication interface may retrieve user credentials, such as from the memory 204 or a SIM card, in order to identify and/or authenticate the user for access to network 208. Even though only one communication interface 206 is shown, it is to be understood that payment instrument 200 may comprise a plurality of communication interfaces, such as two or more of an NFC chip, a WiFi interface, and a mobile data interface.

The payment instrument 200 may further comprise one or more access interfaces 210a, 210b configured to provide access to the one or more sets of identification data. The access interfaces 210a, 210b may have various forms in order to implement interface requirements of legacy card interfaces, such as a credit card chip 210a or a magnetic stripe 210b, that may be used to provide access to a set of identification data, simulating access via a legacy interface to legacy terminals. Even though the access interface 210a is shown on the front side 202a of the payment instrument 200 and the access interface 210b is shown on the back side 202b of the payment instrument 200, it is to be understood that the payment instrument may also comprise only one access interface, such as the access interface 210a only, or more than two access interfaces, such as an additional NFC chip (not shown), which may provide access to the sets of identification data. Furthermore, even though the access interfaces 210a, 210b are shown on two different sides of the payment instrument, the access interfaces can be arranged on one side and/or any side of the payment instrument in any combination.

The payment instrument 200 further comprises one or more displays 212a, 212b, 212c, which may be arranged on one or more sides of the payment instrument 200, such as on the front side 202a and the back side 202b in any combination. Each display 212a, 212b, 212c may be configured to display representations of the one or more sets of identification data or respective parts of a representation of a set of identification data. Each set of identification data may include and/or store a format defining which parts can be displayed on which displays 212a, 212b, 212c. The payment instrument 200 may further store in memory 204 one or more templates identifying typical application areas in order to process and arrange individual entries of the sets of identification data and combine them into representations for display on the one or more displays 212a, 212b, 212c. For example, a set of identification data may indicate that it is for credit card use and the payment instrument 200 may retrieve a template for credit cards and may assemble respective entries of the set of identification data according to the credit card template, for example, by displaying a credit card number, the name of the holder, and a validity indication on display 212b on the front side 202a of payment instrument 200, and an indication of a bank and credit card organization on display 212a on the front side 202a of payment instrument 200. However, display 212c may be reserved for a representation, which may be received from a remote server (not shown) via network 208.

In order to control the payment instrument 200 and receive respective data via the network 208, the payment instrument 200 may further comprise a processing circuit 214, which may be configured to receive, via the communication interface 206, at least a part of a representation of one of the one or more sets of identification data from the remote server. The received part of the representation may be, for example, displayed on display 212c on the back side 202b of payment instrument 200 and may, for example, comprise various security features, such as a signature of the holder, security codes, an image of the holder, and the like. For example, the security features displayed on display 212c may be provided to the payment instrument 200 upon request and after verification of validity and/or authenticity of the user and/or of the payment instrument 200 by the remote server. Furthermore, at least parts of the representation, such as security codes and/or a confirmation number, can be provided with respect to a transaction which is performed using the payment instrument 200 in order to confirm the transaction. Even though display 212c has been described with regard to security features that are received via network 208 from the remote server, it is to be understood that any other display, such as displays 212a, 212b on any side of payment instrument 200 can be used to display the parts of the representation that are received via the network 208 from a remote server.

The payment instrument 200 may further store in memory 204 a plurality of apps or indications of apps, and the processing circuit 204 may be configured to initiate execution of the one or more apps. Preferably, the apps are executed on a remote server or within a cloud and the processing circuit 214 may initiate respective processing by submitting the indication of the app to the remote server. Hence, the processing circuit 214 can have limited processing resources and functionality in order to enable an inexpensive production of the payment instruments. Furthermore, execution of apps on a remote server further increases the level of security of the payment instrument 200, for example, since local manipulations of the payment instrument 200 and/or security features are impossible or at least made difficult.

The apps may provide any functionality related to payment instrument 200. For example, the apps may allow for reward systems, yield systems and promotional programs. According to one example, a credit card company may issue a promotional offer to a card holder via a respective app, which may be directly displayed on the one or more displays 212a, 212b, 212c on payment instrument 200. This may avoid excessive processing and management of paper-based promotions, that may often be completely forgotten about or missed completely. Rather, the app may be configured to provide the user with respective information at a suitable point in time, such as if the user is in proximity of a company or institution related to the promotion.

The payment instrument 200 may also use various data from the communication interface 206 or the one or more access interfaces 210a, 210b in order to determine a location of the user. Additionally, the payment instrument 200 may also comprise a sensor (not shown) configured to determine a geolocation of the payment instrument 200. This data may be provided to an executing app, either on the payment instrument 200 or on a remote server in order to provide suitable data for the user.

According to another example, an app may provide special offers, which could be made available to the card holder as they walk nearby a local branch of a business. The user may not have even intended on going in the local branch and even may not plan on actually purchasing something, however, the user may be reminded by the app of respective offers and possibilities by displaying a respective data on the one or more displays 212a, 212b, 212c.

Furthermore, a (remote) server may collect information about the user, which may be coupled to a user profile of the user stored by an online service, such as in a social network. The user profile may include indications of interests and/or preferences of the user and may be used to configure an executing app of payment instrument 200. Accordingly, an executing app may also have access to user data, including data on where users spend their time, where they spend money, or what they spend their money on. This allows for real-time offers presented to users on the displays 212a, 212b, 212c, including aspects of user places, time, and money, including money limits and money spent, as well as any further information, which can be derived from collected user data.

The one or more remote servers or a cloud of servers within the network 208 may, for each payment instrument 200, persistently maintain an execution environment, wherein each execution environment may be configured to run an operating system or firmware of the payment instrument 200 and expose an interface specifying capabilities of the payment instrument 200 on one of the remote servers or within the cloud. The server may comprise a management component configured to link an execution environment to a payment instrument, to register each new payment instrument with the server, thereby generating an identification for the new payment instrument and creating an execution environment for the payment instrument. Furthermore, the management component may automatically link payment instruments associated with one user and other devices of the user to each other. Accordingly, the user may register a plurality of devices with the remote management component where, for each device, a persistent execution environment is maintained on the server, for example, in order to execute apps or other program code and/or to render output for individual displays of the devices, such as displays 212a, 212b, 212c of payment instrument 200 directly on the remote server. Similarly, any input data from the payment instrument 200, or any other device connected to the remote server, may be provided to the execution environment on the remote server in order to control the execution of respective apps or other program code within the execution environment. A suitable system for configuring a remote server and maintaining a persistent execution environment online, such as within network 208 on respective remote servers or within a cloud is, for example, disclosed in patent application "Connected Devices," U.S. patent application Ser. No. 13/668,078, filed on Nov. 2, 2012, by the applicant, which is incorporated herein by reference.

Figure 3:
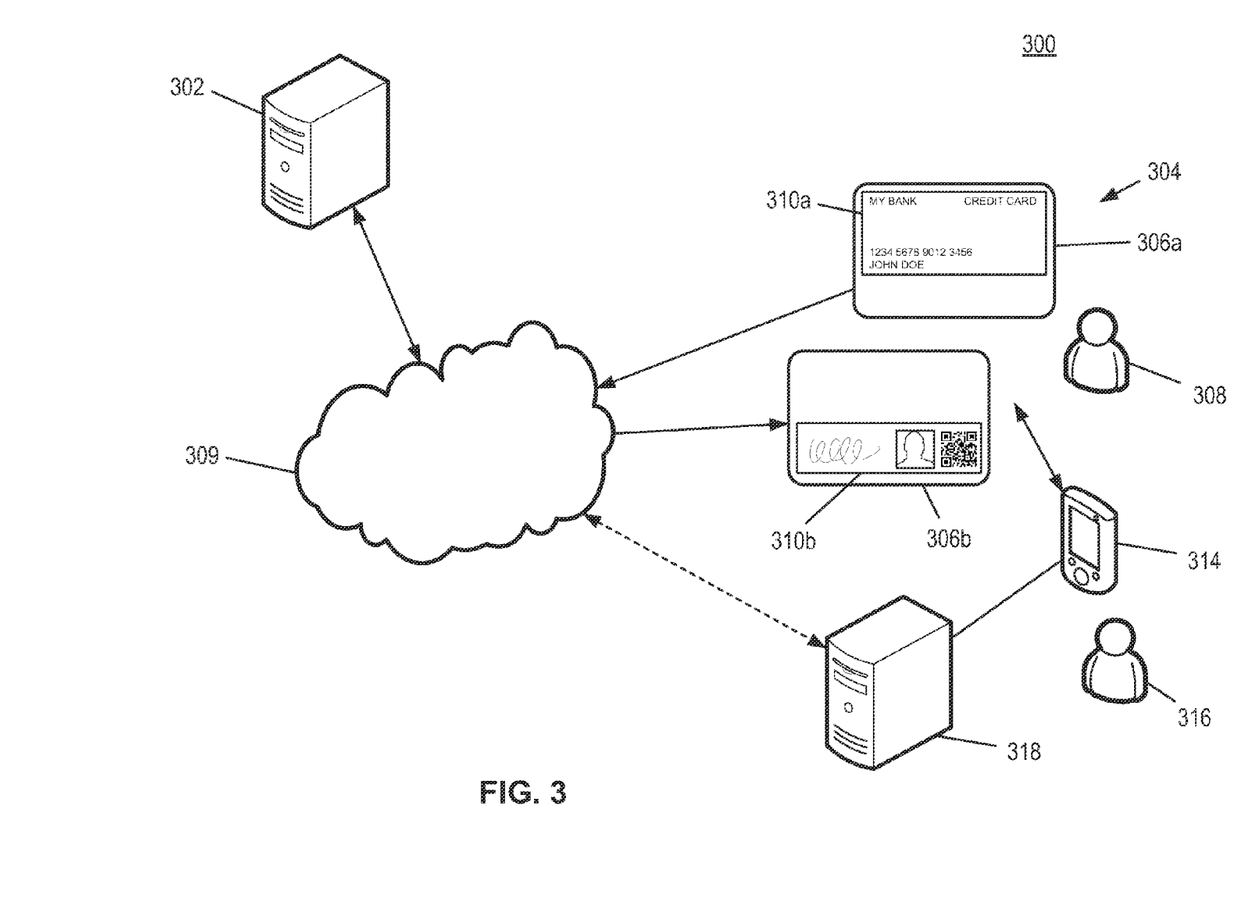
FIG. 3 shows a system according to one embodiment of the present disclosure.

FIG. 3 depicts a system according to an embodiment of the present disclosure. The system 300 comprises one or more remote servers, of which only one server device 302 is shown. The server device 302 may represent an issuer or provider of identification data for use with a payment instrument 304, such as the payment instrument 200 of FIG. 2. Similar to the illustration in FIG. 2, the payment instrument 304 in FIG. 3 is shown according to a front side 306a and a back side 306b of the same payment instrument 304. Even though two distinct entities are shown for the front side 306a and back side 306b, it is to be understood that both elements represent two different views on the same payment instrument 304.

The remote server 302 may supply a set of identification data to the payment instrument 304 according to a request of user 308 via network 309. The set of identification data may be stored in a memory of payment instrument 304.

As soon as the user 308 chooses to use the set of identification data related to remote server 302, the payment instrument may identify and analyze the set of identification data and may retrieve at least some of the data, such as a name of a bank and/or credit card institution, a number of a credit card, or a name of user 308, which may be displayed on a display 310a of payment instrument 304.

Furthermore, the payment instrument 304 may issue a request to remote server 302 for a further representation, which may include security features and other elements. The server 302 may receive the request, perform various security checks, such as a verification of the payment instrument 304 and/or the user 308 and others, and may provide a representation to payment instrument 304 via the network 309 to payment instrument 304, which representation may be displayed on a further display 310b on the back side 306b of payment instrument 304. The representation may, for example, include security features, such as one or more of a signature of the user 308, an image of the user 308, a security code or a security number, and the like. Even though the representation may include security features, it is to be understood that any other information may be provided by the remote server 302 for display, which may include most recent information or an update of information which is to be displayed on the payment instrument 304.

The remote server 302 or another remote server (not shown) may execute one more apps for payment instrument 304, for example, in a persistent execution environment linked to payment instrument 304 as discussed above. The apps may trigger the payment instrument 304 and provide further data for display on the displays 310a, 310b. For example, the user 308 may decide to use the payment instrument 304 with a terminal 314 in order to enable a financial transaction, which may be directed at a purchase of goods, provision of services, various reward programs or promotional programs, and the like. An operator 316 of terminal 314 may further verify the authenticity and validity of payment instrument 304 by checking the security features displayed on display 310b. Either the terminal 314 or a computing device 318 may further establish a connection to remote server 302 in order to verify the transaction. Furthermore, based on data of the transaction, the remote server 302 may generate a confirmation code, which may be directly transmitted to payment instrument 304 and displayed on one of the displays 310a, 310b. The displayed data may also be verified by terminal 314 or operator 316 in order to further increase the security level of the transaction.

After completion of the transaction using a current configuration of the payment instrument 304, the user 308 may choose to select another set of identification data that results in a request for a representation of the selected set of identification data via network 309 to remote server 302 or another server (not shown) linked to the selected set of identification data. Hence, the payment instrument 304 may be flexibly applied in a variety of scenarios in a secure way. The payment instrument 304 allows use of a single piece of payment instrument to represent various previous plastic cards while maintaining a high level of security through server-side processing or cloud-based processing of features of the payment instrument instead of local computation only.

While some embodiments have been described in detail it is to be understood that the aspect of the disclosure can take many forms. In particular, the claimed subject matter may be practiced or implemented differently from the examples described, and the described features and characteristics may be practiced or implemented in any combination. The embodiments shown herein are intended to illustrate rather than to limit the invention as defined by the claims.

The invention claimed is:

1. A payment instrument including:
a memory configured to store one or more sets of identification data;
a communication interface configured to connect the payment instrument to a network;
one or more access interfaces configured to provide access to the one or more sets of identification data;
one or more displays configured to display representations of the one or more sets of identification data; and
a processing circuit configured to select one of the one or more sets of identification data, adjust the one or more access interfaces to provide access to the selected set of identification data, request at least a part of a representation of the selected set of identification data from a server, receive, via the communication interface, the at least a part of the representation of the selected set of identification data from the server via the network, and cause the representation to be displayed on the one or more displays.

2. The payment instrument of claim 1, wherein the one or more displays are arranged on one or more sides of the payment instrument.

3. The payment instrument of claim 1, wherein the one or more displays are flexible displays.

4. The payment instrument of claim 1, wherein the one or more access interfaces include a contact surface arranged on one or more sides of the payment instrument.

5. The payment instrument of claim 1, wherein the one or more access interfaces include a chip on one side of the payment instrument and a magnetic stripe on another side of the payment instrument.

6. The payment instrument of claim 1, wherein the processing circuit is further configured to receive, via the communication interface, a new set of identification data and at least a part of a representation of the new set of identification data from the server, store the new set of identification data in the memory, and cause the representation of the new set of identification data to be displayed on the one or more displays.

7. The payment instrument of claim 1, wherein the memory is further configured to store one or more apps, wherein the processing circuit is further configured to initiate execution of the one or more apps and cause data to be displayed on at least one of the one or more displays responsive to execution of the one or more apps.

8. The payment instrument of claim 7, wherein the one or more apps are executed on a remote server, wherein the processing circuit is further configured to receive, via the communication interface, the data for display from the remote server.

9. The payment instrument of claim 1, further comprising an input interface, wherein the processing circuit is further configured to receive user input via the input interface, wherein the input interface is integrated in the one or more displays.

10. The payment instrument of claim 1, further comprising a sensor configured to determine a geolocation of the payment instrument.

11. The payment instrument of claim 1, wherein the payment instrument has the form of a card.

12. The payment instrument of claim 1, wherein the processing circuit is further configured to verify a financial transaction in response to a request from a terminal received via the one or more access interfaces based on a set of identification data.

13. A method for operating a payment instrument connected to a network via a communication interface, comprising:
   maintaining one or more sets of identification data in a memory of the payment instrument;
   providing access to the one or more sets of identification data via one or more access interfaces of the payment instrument;
   selecting one of the one or more sets of identification data;
   adjusting the one or more access interfaces to provide access to the selected set of identification data;
   requesting a representation of the selected set of identification data from a server;
   receiving, via the communication interface, at least a part of the representation of the selected set of identification data from the server via the network; and
   displaying the representation on one or more displays.

14. The method of claim 13, further comprising receiving, via the communication interface, a new set of identification data and at least a part of a representation of the new set of identification data from the server, storing the new set of identification data in the memory, and displaying the representation of the new set of identification data on the one or more displays.

15. The method of claim 13, further comprising maintaining one or more apps in the memory, initiating execution of the one or more apps and displaying data on at least one of the one or more displays responsive to execution of the one or more apps.

16. The method of claim 13, further comprising selecting one of the sets of identification data based on a user input, initiating execution of an app based on the user input, or supplying the user input to an executing app.

17. The method of claim 13, further comprising verifying a financial transaction in response to a request from a terminal received via the one or more access interfaces.

18. A system for operating payment instruments, comprising:
   one or more server devices; and
   a plurality of payment instruments communicating with the one or more server devices via a network,
   wherein each of the plurality of payment instruments includes:
      a memory configured to store one or more sets of identification data;
      a communication interface configured to connect the payment instrument to the network;
      one or more access interfaces configured to provide access to the one or more sets of identification data;
      one or more displays configured to display representations of the one or more sets of identification data; and
   a processing circuit configured to select one of the one or more sets of identification data, adjust the one or more access interfaces to provide access to the selected set of identification data, request at least a part of a representation of the selected set of identification data from a server device of the one or more server devices, receive, via the communication interface, the at least a part of the representation of the selected set of identification data from the server device via the network, and cause the representation to be displayed on the one or more displays.

* * * * *